Figure 1:
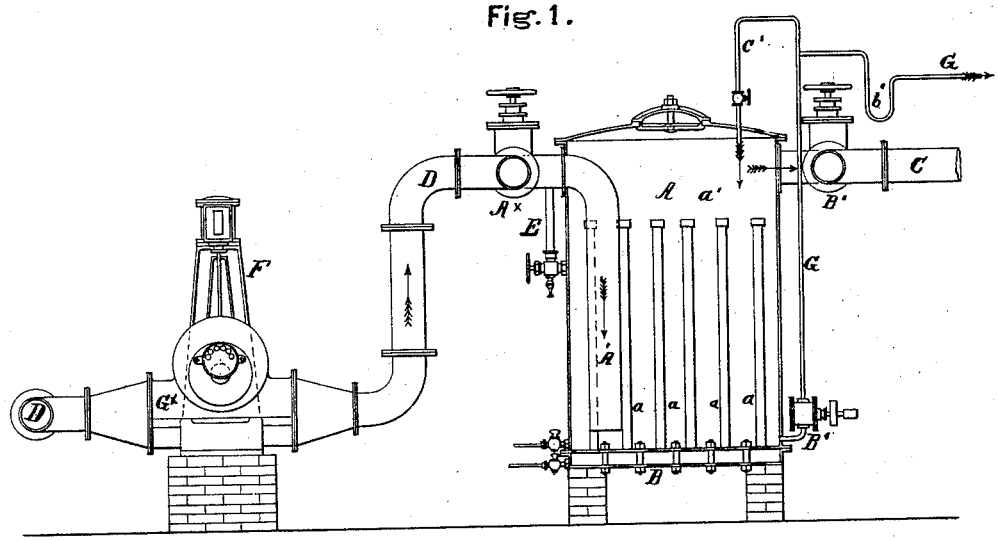

6 Sheets--Sheet 1.

G. OLNEY.
Processes and Apparatus for the Manufacture of Illuminating Gas.

No. 156,172. Patented Oct. 20, 1874.

Witnesses.
Robert Everett.
George E. Uphaue.

Inventor.
George Olney,
Chipman Hosmer & Co,
Attys.

6 Sheets--Sheet 2.

G. OLNEY.
Processes and Apparatus for the Manufacture of Illuminating Gas.

No. 156,172. Patented Oct. 20, 1874.

Witnesses. Inventor.
Robert Everett. George Olney
George E. Uphall. Chipman Hosmer & Co.
 Attys G. OLNEY.
Processes and Apparatus for the Manufacture of Illuminating Gas.

No. 156,172.

6 Sheets--Sheet 3.

Patented Oct. 20, 1874.

6 Sheets--Sheet 4.

G. OLNEY.
Processes and Apparatus for the Manufacture of Illuminating Gas.

No. 156,172. Patented Oct. 20, 1874.

Witnesses.
Robert Everett.
George E. Upham.

Inventor.
George Olney
Chipman Hosmer & Co
Attys.

6 Sheets--Sheet 5.

G. OLNEY.
Processes and Apparatus for the Manufacture of Illuminating Gas.

No. 156,172. Patented Oct. 20, 1874.

Witnesses.
Robert Everett.
George E. Upham.

Inventor.
George Olney
Chipman and Hosmer & Co
Attys

G. OLNEY.
Processes and Apparatus for the Manufacture of Illuminating Gas.
No. 156,172.
6 Sheets--Sheet 6.
Patented Oct. 20, 1874.
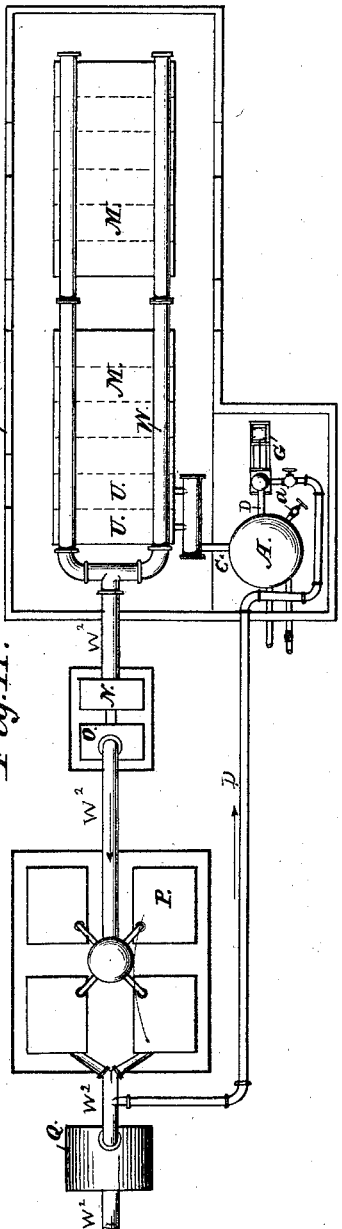
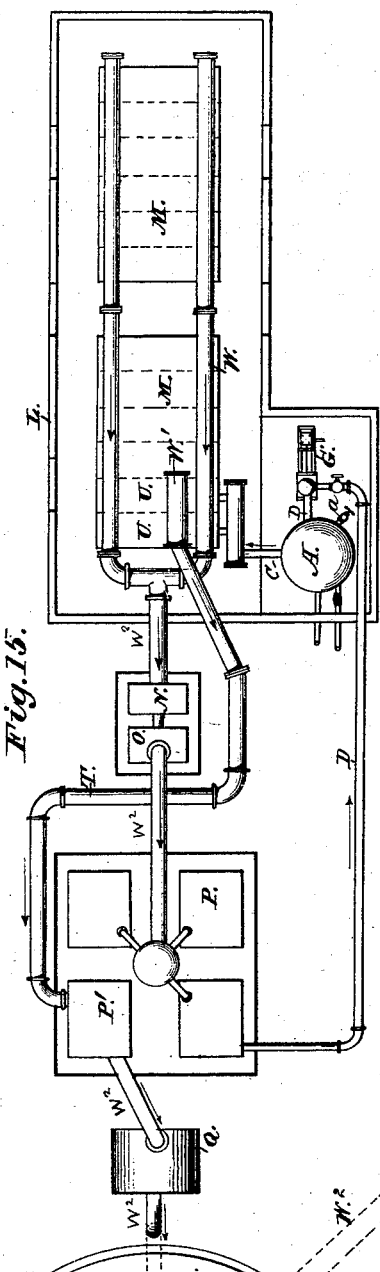

UNITED STATES PATENT OFFICE.

GEORGE OLNEY, OF BROOKLYN, NEW YORK.

IMPROVEMENT IN PROCESSES AND APPARATUS FOR THE MANUFACTURE OF ILLUMINATING-GAS.

Specification forming part of Letters Patent No. 156,172, dated October 20, 1874; application filed April 4, 1874.

*To all whom it may concern:*

Be it known that I, GEORGE OLNEY, of the city of Brooklyn, in the county of Kings and State of New York, have invented certain Improvements in the Manufacture of Illuminating-Gas, of which the following is a specification:

This invention relates to certain new and useful improvements in the manufacture of illuminating-gas; and it consists, first, in a process of manufacturing a gas of high candle-power from the ordinary bituminous or coking coal, or other gas-producing substances, by drawing from said coal, &c., all the gas that can be derived therefrom irrespective of its illuminating power, using the common retorts and the usual and ordinary facilities of a retort-house in its production, and in charging said gas with petroleum, or other hydrocarbon, and converting the mixture, by passing the same slowly through a highly-heated retort, into a fixed gas of any designated candle-power, as will be more particularly hereinafter described; second, in the combination of the above process with the ordinary gas-works by tapping the main between the retorts and point of consumption, and carrying the whole or a portion of the gas back to and through the vessel or carbureter where it is charged with hydrocarbon, and then passed into one or more retorts to be decomposed into fixed gas. The retorts are chambered so as to keep the gas as long as possible subjected to the action of heat to insure thorough decomposition of the hydrocarbon; third, in the process of decomposing the heavier portions of the hydrocarbon simultaneously with the lighter portions taken over by the gas, by carrying the said heavier portions bodily from the lower part of the carbureter into the retort in which the lighter portions are being decomposed, substantially as hereinafter described; fourth, in certain new and useful improvements in apparatus for carrying the above process into effect.

The average yield of gas from a ton of ordinary bituminous or gas-coking coal, by the common process of manufacturing gas therefrom, is about nine thousand cubic feet, and to bring such gas up to the proper standard—say, sixteen-candle power—it is necessary to employ, in connection with such coal, cannel-coal, or other costly coal, rich in carbon. By my process I draw from fifteen thousand to eighteen thousand cubic feet of gas from a ton of the ordinary bituminous gas-coal, or inferior coal practically useless for the manufacture of gas for illuminating purposes, volume with me being the only desired result in the first stage, the candle-power being brought up to the required standard in the subsequent treatment, as will be hereinafter fully described.

In carrying out my invention, I draw the gas into a carbureter containing hydrocarbon heated by steam in any convenient manner. I pass the gas down into and through the hydrocarbon, so as, in connection with the steam-heat, to violently agitate the same, and cause it to thoroughly commingle with the gas, so that it shall be carried over in particles, as well as in vapor, to the retort where the mechanical mixture is decomposed and converted into a permanent fixed gas. In order, however, to insure a thorough decomposition of the heavier portions of the hydrocarbon which may not be carried over by the gas, I provide a means for carrying the hydrocarbon bodily over into the retort from the lower part of the carbureter or heating-vessel by means of a pump or other suitable device, in which retort it is decomposed simultaneously with the gas and hydrocarbon vapor passing into the same.

Figure 2:
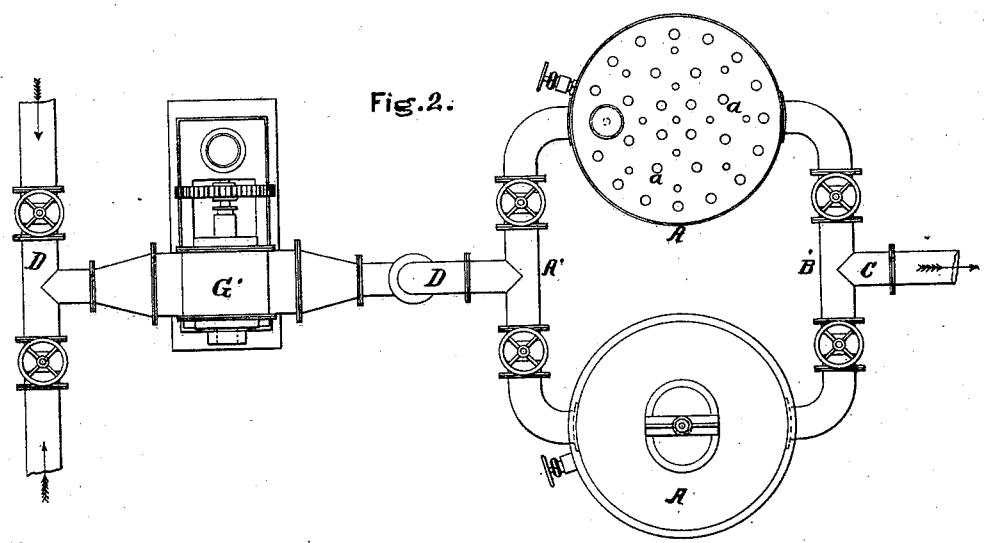
Figure 4:
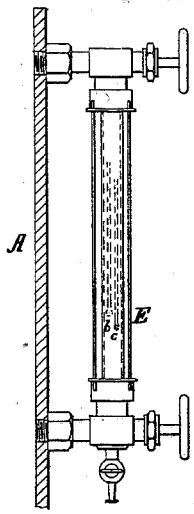
Figure 6:
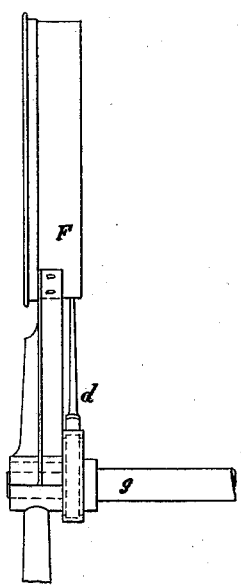
Figure 5:
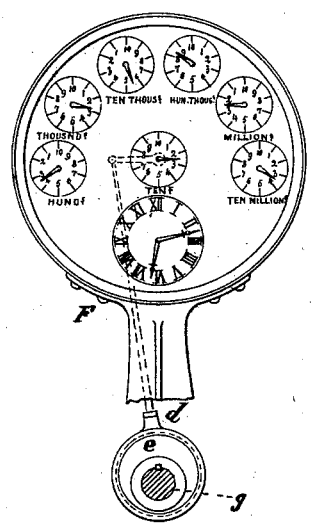
Figure 3:
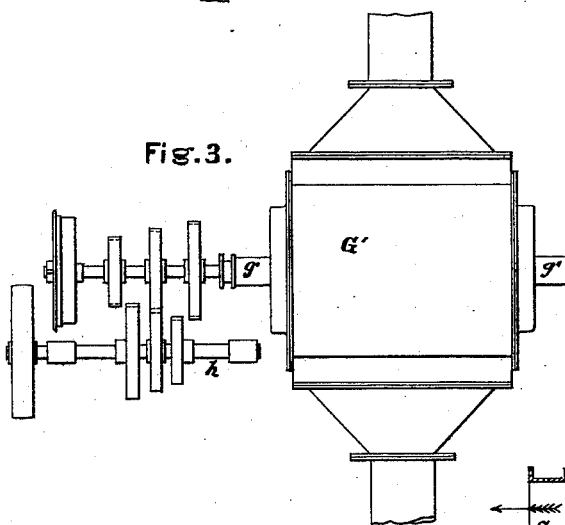
Figure 7:
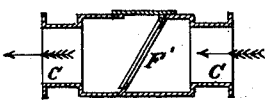
Figure 8:
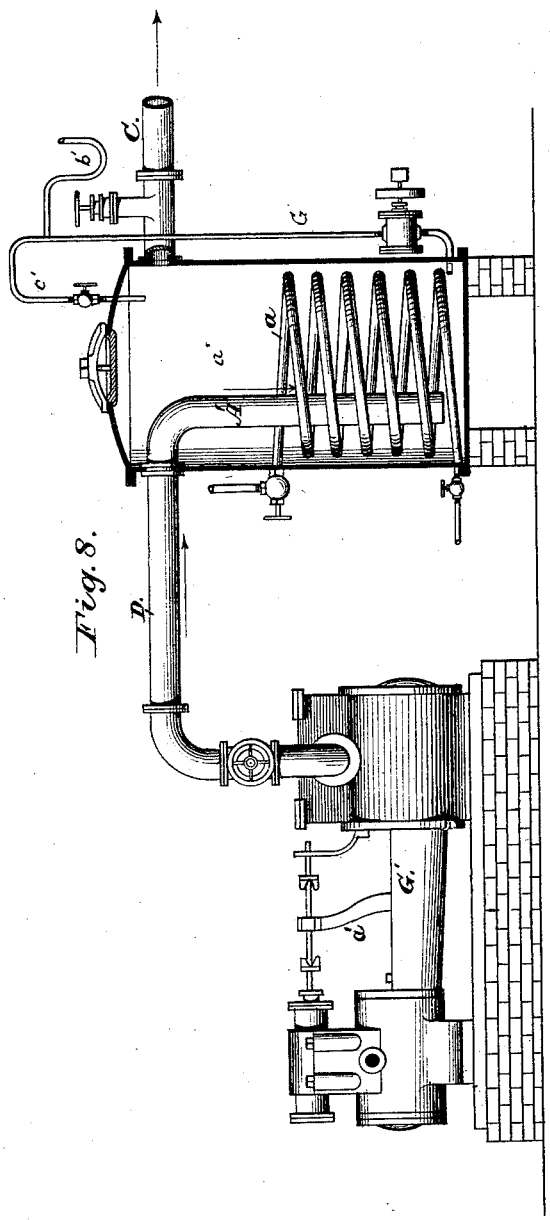
Figure 9:
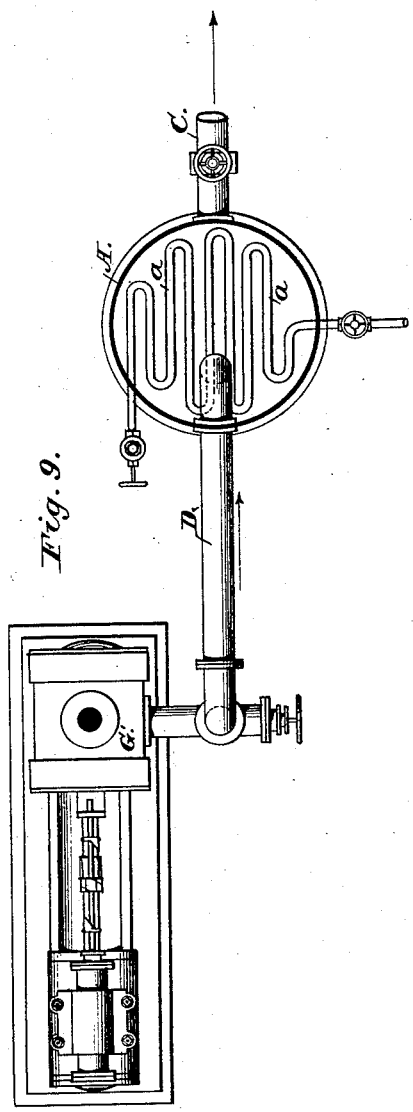

Figure 1 is an elevation and partial vertical section of an apparatus made and operating according to my invention. Fig. 2 is a plan view of the same. Fig. 3 is a plan view, detached, of one form of the gas-forcing pump, which constitutes a portion of the apparatus. Fig. 4 is a side view, detached, of the devices used to indicate the temperature and density of the hydrocarbon. Figs. 5 and 6 are detached views, showing the means whereby the volume of gas made is accurately known and registered. Fig. 7 is a detached sectional view of a valve provided to prevent regurgitation of the gas, while in process of manufacture, from one part of the apparatus to another. Fig. 8 is a side view and vertical section of a modification of the apparatus, and Fig. 9 is a plan view of another modification of same. Fig.

Figure 10:
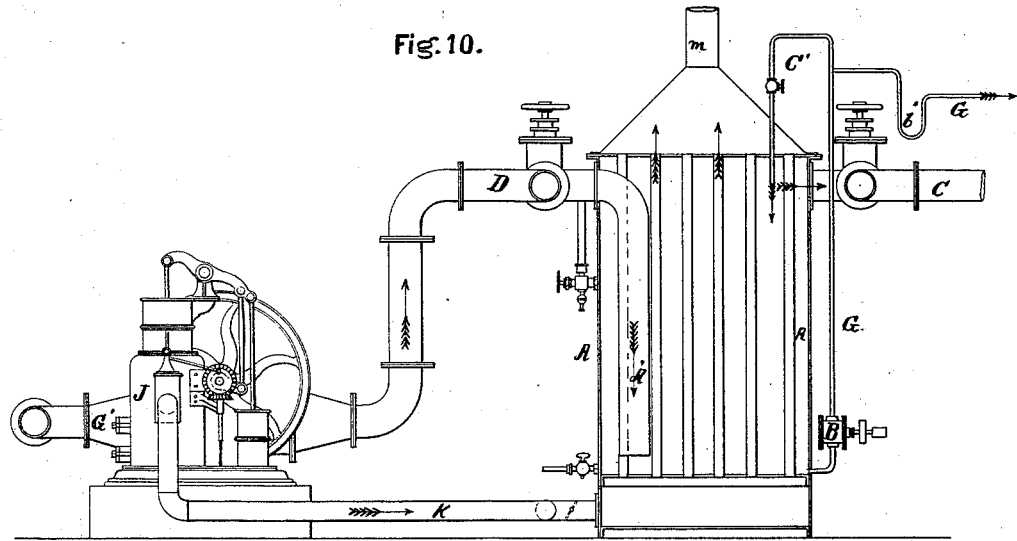
Figure 11:
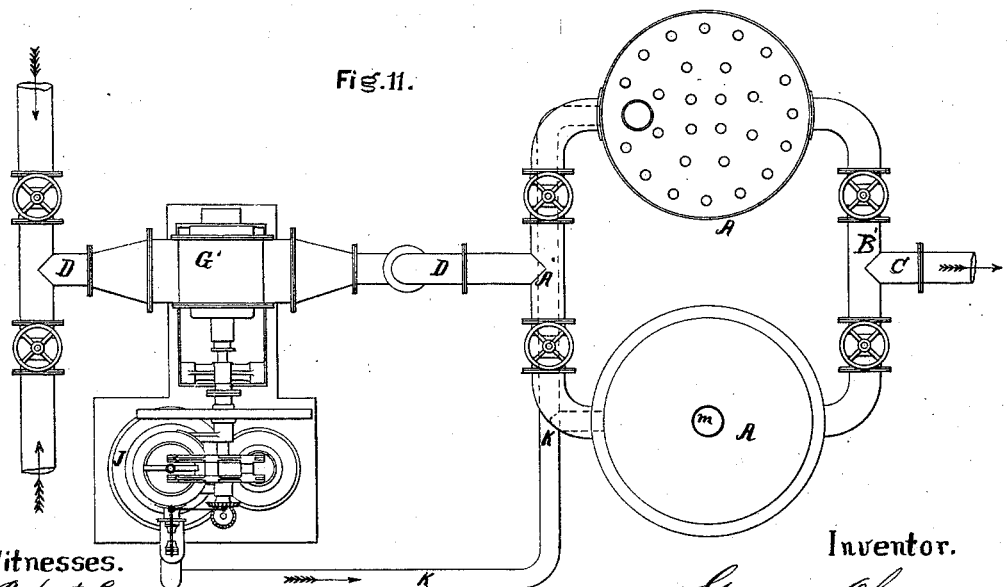
Figure 12:
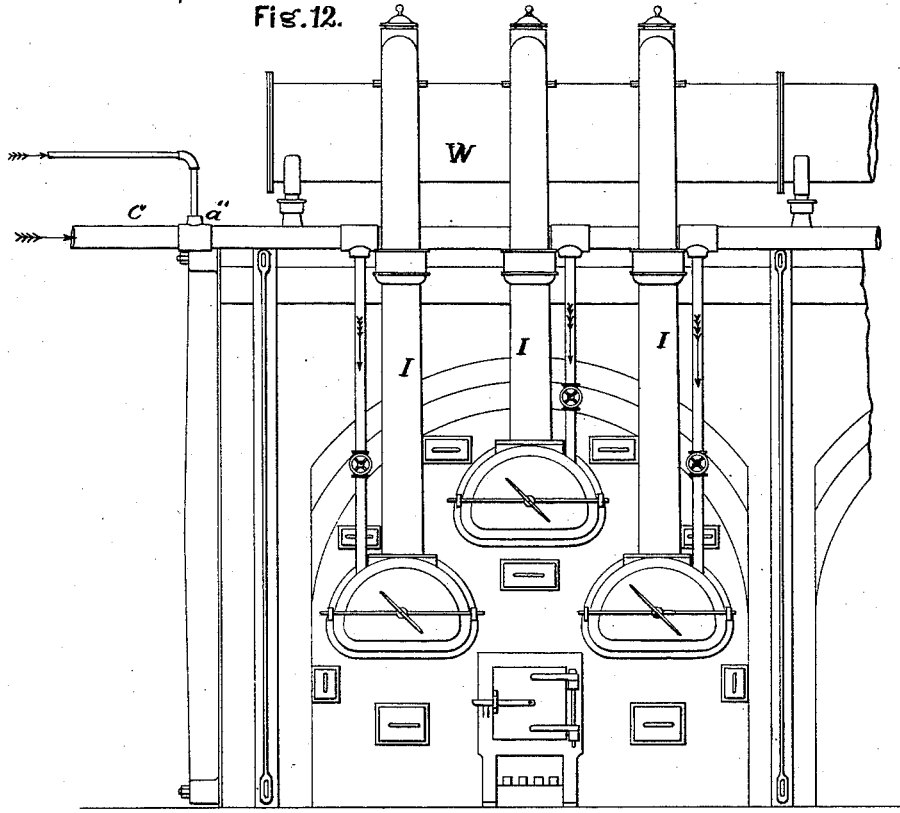
Figure 13:
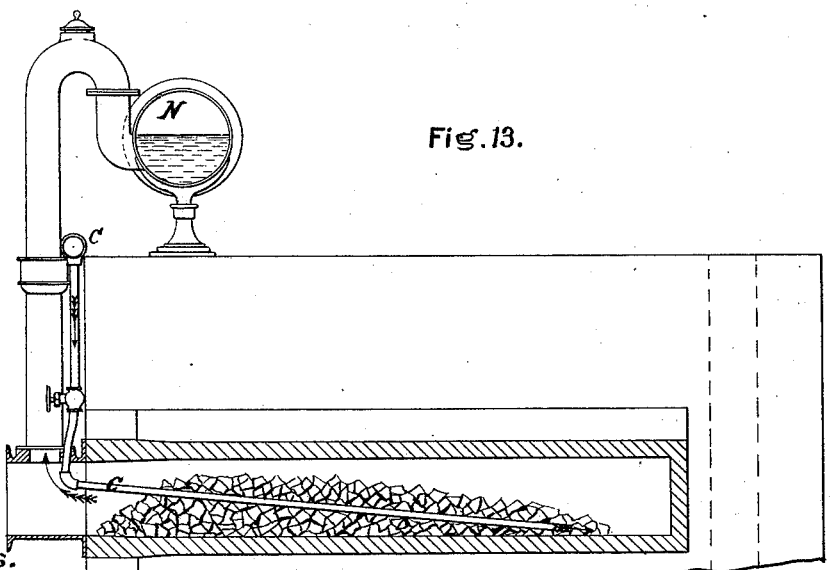

10 is a vertical section of another modification, of which Fig. 11 is a plan view and partial horizontal section. Fig. 12 is a front elevation of a bench of retorts designed in the practice of the invention for use in connection with the parts represented in Figs. 1 and 2, 8 and 9, 10 and 11. Fig. 13 is a longitudinal section of the same. Figs. 14 and 15 represent plan views of the ordinary gas-works, showing my invention as employed in connection therewith.

The carbureter A, as shown in Figs. 1, 2, 10, and 11, is made in two parts identical in construction and connected by pipes A' and B', the former of which forms part of the inlet-pipe D and the latter part of the outlet-pipe C, the purpose of which is hereinafter fully set forth. When desired, the carbureter may be made single—that is to say, with but one of the parts represented in the just-aforesaid figures, as fully shown in Figs. 8 and 9. It may be of rectangular or other suitable shape, and is provided with a sheet-metal bottom, underneath which is a steam-chamber, B. From this project upward radiator-tubes $a$, closed at their upper ends.

It is evident that, instead of the radiator-tubes, other steam-heating devices may be employed—such, for instance, as an internal steam coil or pipe, a steam-drum, or an external steam jacket or chamber, for the purpose of heating the hydrocarbon in the carbureter.

At or near the top of the carbureter A, previously herein indicated, is the outlet-pipe C, leading to or connected with a retort, constructed as indicated in Figs. 12 and 13, or in any other suitable manner. D is the inlet-pipe extended downward nearly to the bottom of the carbureter through the agency of the pipe A', forming a part of or continuation of the same. E is a glass gage, similar to an ordinary water-gage, except that is made large enough to contain a thermometer, indicated in dotted outline at $b$ in Fig. 4, and a hydrometer, indicated in like manner at C in the same figure. The outer end of the inlet-pipe D is connected to the gas-main, and the said pipe is furnished at any desired point between its two ends with a pump, G, or equivalent forcing mechanism. This may be of the rotary kind, as shown in Figs. 1, 2, 3, 10, and 11, or on the reciprocating system, as represented in Figs. 8 and 9. Arranged in suitable relation to this forcing-pump or equivalent device, is a registering apparatus, F, with the usual index fingers and dials, and which, being of well-known character and construction, needs no particular description here. This register is actuated by ratchet-wheel operated by a pawl or lever, $d$, attached to an eccentric, $e$, provided on the rotating shaft $g$ of the pump; or, when a reciprocating pump is used, as indicated in Figs. 8 and 9, by a pawl-lever or like device attached to the arm $a'$, provided on the piston-rod and forming part of the valve-motion of the pump. With the rotary pump there is provided, parallel to its shaft $g$, a counter-shaft, $h$, and on the two is arranged a system of cone-pulleys and bands, as shown in Fig. 3, whereby, from any given speed of prime mover, the speed of the pump may be regulated on occasion, as hereinafter fully explained.

The carbureter is also provided with a pipe, G, the arrangement and functions of which are hereinafter fully set forth, and which is furnished with suitable cocks, whereby its connection with the interior of the carbureter may be shut off when desired.

The carbureter being filled—say, to about the upper ends of the radiator-tubes $a$, or their equivalents—with petroleum, steam, or equivalent hot fluid admitted to the chamber B and radiator-tubes $a$, the pipe G being closed as aforesaid, and the pump set in motion to force gas inward through the inlet-pipe, the operation is as follows:

The gas, issuing from the lower end of the inlet-pipe, passes up through the hydrocarbon to the space $a$ above the same, and in so doing becomes charged or saturated with hydrocarbon, which it carries off in the form of particles and condensable vapor. From the space $a$ the saturated gas is conveyed through the outlet-pipe C to the retort, which may be of any ordinary or suitable construction, as shown in Fig. 12 and 13, and chambered so as to retain the gas and hydrocarbon as long as possible, but which is maintained at as near a white heat as practical, to insure what may be termed destructive distillation of the commingled materials, which are converted thereby into a chemical permanent or fixed gas of great illuminating power.

It should be mentioned that any regurgitation of the gas in the outlet-pipe is effectually prevented by the valve F, the form of which is indicated in Fig. 7, and which is arranged at any suitable point in the aforesaid pipe.

Inasmuch as the rapid vaporization of the hydrocarbon by the gas renders latent a great quantity of heat, which, if not replaced, would soon reduce the temperature so low as to effectually prevent successful operation, it is necessary to replace the heat thus rendered latent, which is done by the agency of steam, or, in lieu thereof, hot air, or other heated-fluid medium, which is admitted to the carbureter by internal pipes or chambers, or external jackets or chambers.

As the readiness with which the hydrocarbon is absorbed by the gas is directly dependent upon the density and temperature of the hydrocarbon, it follows that the hydrometer and thermometer in the glass gage E afford convenient and accurate means of ascertaining the temperature and specific gravity of the hydrocarbon fluid.

The volume of resultant gas being directly dependent upon the volume of poor gas introduced, the known capacity and registered revolutions or strokes of the forcing-pump enable the quantity of poor gas, and consequently the volume of resultant gas, to be recorded by the index fingers and dials of the registering-mechanism E.

For the use as a carbureting agent of heavy or crude petroleum or hydrocarbon, instead of naphtha or light hydrocarbon, the apparatus is provided, as shown in Figs. 1, 8, and 10, with a pipe, G, extended upward from its lower part to a height somewhat greater than the carbureter itself, bent at $b'$ to provide a trap, and thence carried to the highest point or part of the outlet-pipe, whence it passes through the said pipe to the retort. Situated at any desired point in this pipe G is a rotary or other pump, operating to force the lower or heavier portions of the liquid from the carbureter to the elevated position of the outlet-pipe C, as indicated at $a''$, in Fig. 12, whence it flows simultaneously with the passage to the retort of the gas of inferior quality, saturated with the lighter portions of the liquid, in the same manner as in the other modifications of the invention hereinbefore described. The heavier liquid on entering the retort falls upon the heated surface of coke, broken stone, metal, or other material provided in the usual manner, and is distilled into an incondensable gas, simultaneous with the similar treatment, by heat, of the charged gas entering the retort from the outlet-pipe C of the carbureter, the products from the heavy liquid aforesaid, and the charged gas, combining in the ultimate product, and producing incondensable gas of great illuminating power.

From the upper end of the pipe G is extended a return-pipe, $c'$, so arranged that any surplus hydrocarbon forced into the pipe G will follow the return-pipe and be returned to the carbureter. It will be understood that the illuminating-gas passes from the retorts in the usual manner, through the pipe I to the hydraulic main W, and thence to the gasometer.

In some instances, where a caloric or hot-air engine is available, the exhaust air from the same may be substituted for the steam used in the heating, or maintaining at the requisite temperature, the hydrocarbon in the carbureter, and, moreover, the form and construction of the latter may be modified in various ways to permit the use, for this purpose, of air or steam, an ordinary vertical-flue boiler, under some conditions, being capable of advantageous use in lieu of the carbureter constructed specifically as hereinbefore described.

The hereinbefore-mentioned employment of a caloric-engine is shown in Figs. 10 and 11, in which J indicates the engine giving motion to the gas-forcing pump G, simultaneously with which the hot exhaust of said engine passes through and from the pipe K into the heating devices of the carbureter A, to heat the contents thereof, as and for the purposes hereinbefore fully set forth. As shown in the drawings last mentioned, the carbureter is identical with a vertical tubular steam-boiler, the fire-box and tubes serving the same purpose as the steam-chamber and radiator-tubes shown in Fig. 1, the exhaust, after having been thus utilized, passing to the stack or uptake $m$.

Figs. 14 and 15 of the drawings represent my invention applied to the ordinary gas-works. In the modification shown in Fig. 14 only a portion of the gas is conveyed back to be enriched. L represents a retort-house of the ordinary construction, and M M the benches of retorts. W represents the hydraulic main, and $W^2$ the main leading therefrom to the washer, condenser, purifier, &c. N and O represent the washer and condenser, and P the purifier. Q represents the station-meter, R the gas-holder. The main $W^2$ may be tapped at any convenient point between the retorts and point of consumption, and the gas carried back through a carbureter, and charged with hydrocarbon, as hereinbefore described, and then converted into a fixed gas by passing through one or more retorts or benches of retorts. I generally tap the main between the purifier and station-meter, and carry the gas back by a pipe, D, to a pump, G', by which it is forced through the said pipe D, and down into the carbureter A, constructed as hereinbefore described, and heated by steam. In said carbureter it becomes thoroughly charged with hydrocarbon, and is then passed into the retorts or benches U U, and from said retorts into the main, with the gas from the other retorts. Fig. 15 shows a modification of my invention, in which the whole of the gas is drawn from the purifier P, forced into a carbureter, A, then into the retorts U U, and from said retorts into a separate hydraulic main, $W^1$, from which it passes through the main T into the purifier or box P', and then on through the station-meter to the gas-meter, as usual.

I claim—

1. The process of manufacturing illuminating-gas from ordinary bituminous or inferior coal, or other gas-producing substance, by drawing from said coal, &c., all the gas that can be obtained therefrom, irrespective of illuminating power, and afterward forcing such gas, which is unfit for commercial use, violently down and through hydrocarbon, heated by steam heat, substantially as described, so that the candle-power of the resultant gas may be regulated at will, and then converting the mixture into a fixed gas, as herein described.

2. The process herein described of manufacturing a gas of high candle-power from weak gas, produced as described, by charging said gas with hydrocarbon by steam heat, and decomposing the mixture in a retort simultaneously with the heavy portions of the hydrocarbon, as set forth.

3. The process herein described of producing a gas of high candle-power, by drawing off the gas from the main of an ordinary gas-works, between the retorts and point of consumption, and conveying the whole or a portion thereof back to and through a vessel or carbureter heated by steam, in which it is charged with hydrocarbon, and from thence into one or more retorts, in which the mixture is converted into a fixed gas, as herein described.

4. An apparatus for producing illuminating-gas, consisting of a vessel or carbureter heated by steam, provided with a pipe having a suitable cock or valve to regulate the supply of steam, a pipe for conducting the weak gas into said vessel or carbureter, provided with a cock or valve for regulating the quantity of gas admitted, and a pipe for conveying the mixture into the retorts, the whole being constructed substantially as described, so that a perfect mechanical mixture of gas and hydrocarbon in any desired proportions may be formed at will, in order to regulate the candle-power of the resultant gas, in combination with a retort or bench of retorts for converting the mechanical mixture into a uniform fixed and permanent gas, as herein described.

5. The combination, with the forcing-pump, of a registering-mechanism, arranged as described, so that the recorded volume forced to the vessel or carbureter may indicate the volume of gas charged with hydrocarbon issued from the latter, and consequently that of the manufactured gas from the retorts, as herein described.

6. The combination, with a vessel or carbureter, constructed as described, of a pipe and forcing device, for conveying the heavier portion of the hydrocarbon to the retort simultaneously with the transmission of the gas charged with hydrocarbon, as herein specified.

7. The process of manufacturing gas of high candle-power, by forcing poor gas down through and in contact with hydrocarbon in a vessel or carbureter heated by steam, in such a manner as to thoroughly commingle the gas and hydrocarbon, and carry the same over in particles as well as vapor to the decomposing-retort, and prevent the formation of residuum or dead-oil in the carbureter, as herein described.

8. The combination of a forcing-pump, $G'$, between the main and the carbureter, with the pipes D and $A'$, for conveying the gas into said carbureter A, and extending into the same, and terminating near the bottom thereof, to carry the gas down and through the hydrocarbon, and violently agitate the same to prevent the formation of residuum, a carbureter heated by steam, a pipe, C, for conveying the gas and hydrocarbon to the retorts, and a retort for converting the gas and hydrocarbon into a fixed gas, as herein described.

9. The combination, with the carbureter, as herein described, of a caloric-engine for driving the pump and heating the carbureter, as herein set forth.

10. The carbureter, consisting of a vessel provided with vertical flues, through which the steam or other fluid heating medium may be passed, in order to heat the hydrocarbon, as herein described.

GEORGE OLNEY.

Witnesses:
 INGERSOLL LOCKWOOD,
 CHAS. H. NEILSON.